(12) United States Patent
McAlindon

(10) Patent No.: US 6,756,968 B2
(45) Date of Patent: Jun. 29, 2004

(54) ERGONOMIC HUMAN-COMPUTER INPUT DEVICE

(75) Inventor: Peter J. McAlindon, Orlando, FL (US)

(73) Assignee: Keybowl, Inc., Winter Park, FL (US)

( * ) Notice: Subject to any disclaimer, the term of this patent is extended or adjusted under 35 U.S.C. 154(b) by 159 days.

(21) Appl. No.: 09/993,260

(22) Filed: Nov. 14, 2001

(65) Prior Publication Data
US 2002/0109667 A1 Aug. 15, 2002

Related U.S. Application Data
(60) Provisional application No. 60/248,472, filed on Nov. 14, 2000.

(51) Int. Cl.[7] .................................................. G09G 5/00
(52) U.S. Cl. ........................ 345/169; 345/168; 345/156
(58) Field of Search ................................ 345/168, 169, 345/156, 157, 163, 167, 184; 341/20, 21, 22, 23; 400/489; 200/5 R, 6 A

(56) References Cited

U.S. PATENT DOCUMENTS

| | | | | |
|---|---|---|---|---|
| 4,849,732 A | * | 7/1989 | Dolenc | 341/20 |
| 5,012,230 A | * | 4/1991 | Yasuda | 345/160 |
| 5,059,958 A | | 10/1991 | Jacobs et al. | |
| 5,067,834 A | * | 11/1991 | Szmanda et al. | 400/489 |
| 5,087,910 A | * | 2/1992 | Guyot-Sionnest | 345/169 |
| 5,137,384 A | * | 8/1992 | Spencer et al. | 400/489 |
| 5,252,952 A | * | 10/1993 | Frank et al. | 345/157 |
| 5,294,121 A | * | 3/1994 | Chiang | 273/148 B |
| 5,396,222 A | * | 3/1995 | Kus et al. | 340/679 |
| 5,408,621 A | * | 4/1995 | Ben-Arie | 700/85 |
| 5,430,262 A | * | 7/1995 | Matsui et al. | 200/5 A |
| 5,473,325 A | | 12/1995 | McAlindon | |
| 5,565,891 A | * | 10/1996 | Armstrong | 345/167 |
| 5,621,196 A | * | 4/1997 | Nishijima et al. | 200/6 A |
| 5,638,062 A | | 6/1997 | McAlindon | |
| 6,246,019 B1 | * | 6/2001 | Nakamura et al. | 200/6 A |
| 6,603,459 B2 | * | 8/2003 | Matsufusa et al. | 345/156 |
| 6,642,920 B2 | * | 11/2003 | Osawa et al. | 345/169 |
| 2002/0149566 A1 | * | 10/2002 | Sarkissian | 345/168 |
| 2003/0020694 A1 | * | 1/2003 | Kim et al. | 345/169 |
| 2004/0008186 A1 | * | 1/2004 | McAlindon | 345/168 |

* cited by examiner

Primary Examiner—Xiao Wu
(74) Attorney, Agent, or Firm—Norman A. Nixon; Beusse Brownlee Wolter Mora & Maire, P.A.

(57) ABSTRACT

An ergonomically developed, dome-shaped, alphanumeric interface apparatus for use with an electronic system, such as a computer or electric typewriter is described. The apparatus is configured in accordance with ergonomic principles and uses chording of both hands to type the characters of any user-defined alphabet. The device includes a set of domes that are shaped and contoured to conform to the shape of hands in a relaxed state and to distribute pressures across the splayed underside of the user's hand. Each dome is capable of movement in a plurality of discrete lateral sectors. The domes used together, utilizing a chording principle, can generate up to 144 characters depending on how many discrete movements are defined by the user. In a nonchording mode of operation, each dome is capable of producing up to 12 characters independently of the other dome. The two-handed implementation disclosed utilizes input movements that enable keystroke actuation via only slight arm or hand movement, no finger movement being required. In addition, cursor control is possible via either dome.

10 Claims, 5 Drawing Sheets

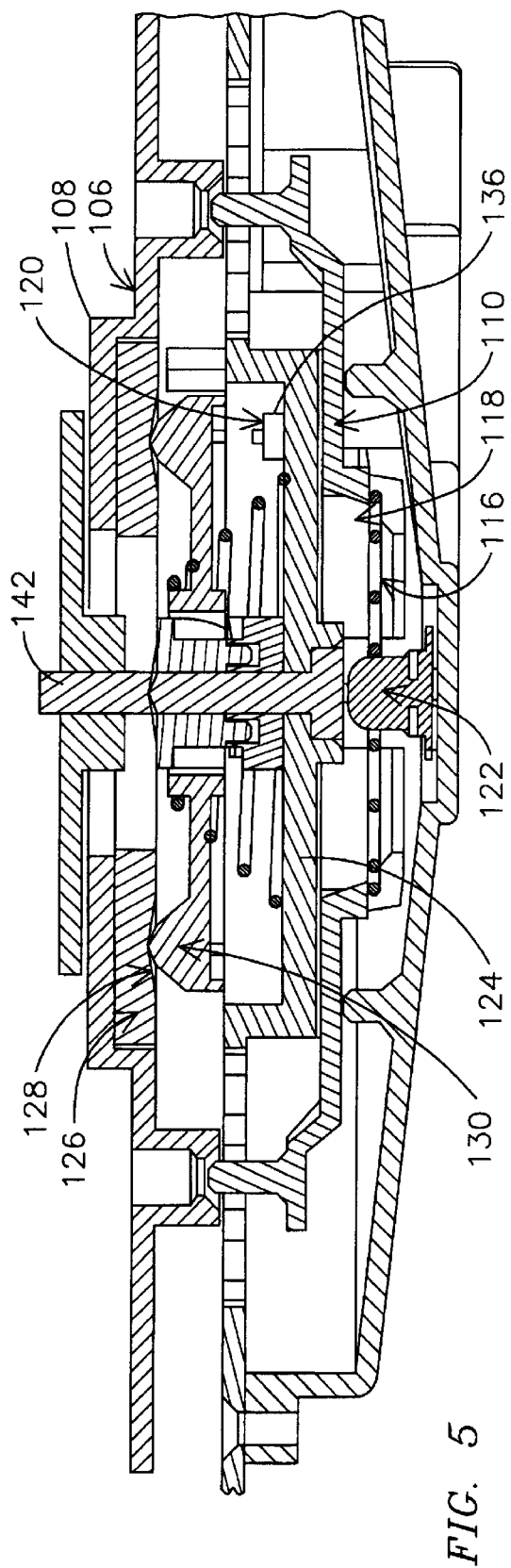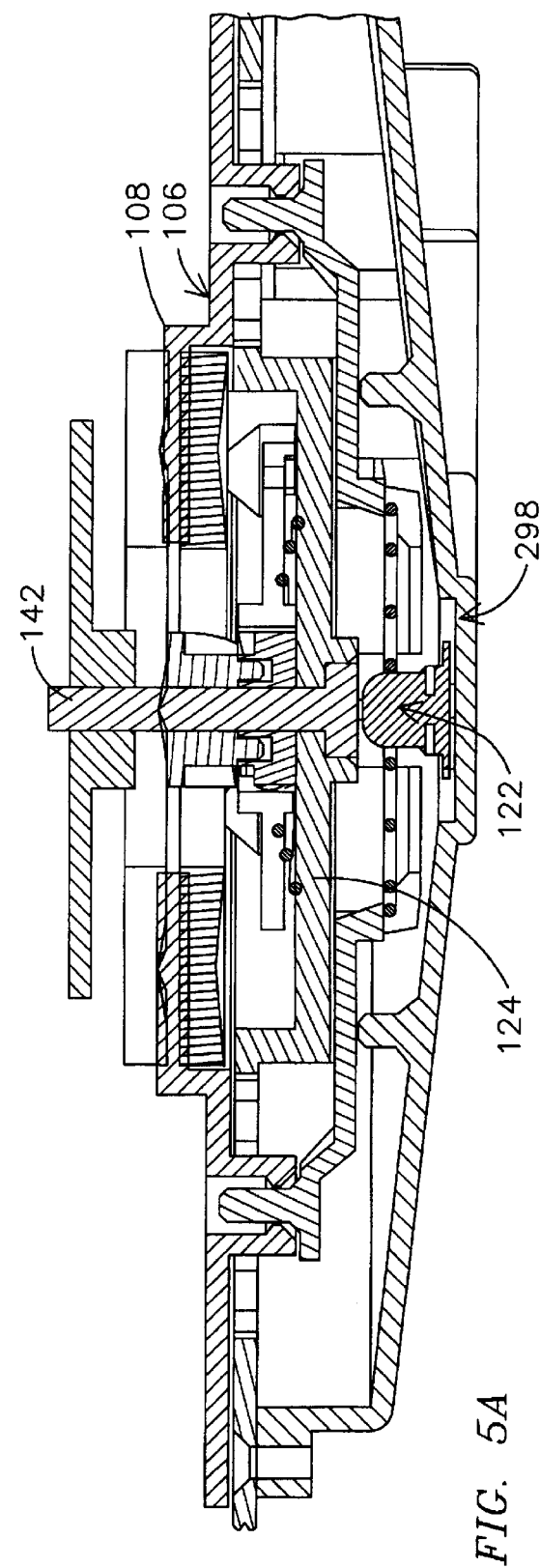
FIG. 5
FIG. 5A

ERGONOMIC HUMAN-COMPUTER INPUT DEVICE

This application claims the benefit of provisional application No. 60/248,472 filed Nov. 14, 2000.

BACKGROUND OF THE INVENTION

The present invention relates to a human-computer interface for data entry, and more particularly, to a device that is ergonomically designed with reference to the architecture and functions of the human hand, wrist, and arm for providing data input to a computing device.

The development of ergonomically designed keyboards has resulted from an increased awareness and identification of physical problems associated with the use of conventional typewriter-like keyboards. An ergonomically designed keyboard attempts to create a key layout that reduces finger travel and fatigue; promotes a more natural hand, wrist, and arm typing posture through design and support structures; or employs various key activation schema in order to enhance typing performance.

Due to the proliferation and availability of computer systems, there has been a dynamic growth in the use of keyboard devices. The term "computer systems" is used generically to refer to any microprocessor based device having a hand or finger operated data entry system, including, for example, PC's, Palm Pilots®, or Sony Game Boys®. Various annoying and debilitating muscular syndromes have accompanied this expansion, resulting from the repetitive and fatiguing hand, wrist, and finger motions that are required in the use of conventional typewriter like keyboards. There has been a growing concern over neuromuscular injuries among clerical workers, journalists, computer programmers, and others who use computers or typewriters extensively. These injuries, one widely publicized of which is carpal tunnel syndrome, translate not only into pain and potential disability for the affected users, but also into significant loss of money, time, and productivity for businesses. Attention to these problems is not new in the art, as is evidenced by many serious attempts to alleviate keyboard-use "injuries" through innovative keyboard layouts and architectural designs.

Force, repetition, posture, rest, and stress are major factors to be considered in controlling and eliminating keyboard-related injuries (KRIs). Analysis of each factor, both independently and in relation to one another, is necessary in designing a keyboard that eliminates or reduces KRIs, force and repetition being perhaps the most important in the development of an ergonomically designed keyboard. Force is related to the musculature and conformation of the fingers and hands, which place limitations on their ability to perform a given task.

An abundance of human-computer_interaction literature has suggested that some of the recently developed alphanumeric input devices may be more efficient, easier to learn, and may cause less physical trauma than conventional typewriter like keyboards. Of these recently designed keyboards, most incorporate one or more design features that enhance typing performance and reduce or eliminate fatigue or injury. These design features include: (1) splitting the keyboard to minimize wrist deviations; (2) key contouring and flexible key mapping to minimize finger travel; (3) built-in hand and arm support; (4) a ternary capability in which keys rock back and forth to type; (5) a capability to rotate and tilt the device into numerous positions; and (6) a chordal capability, in which more than one key must be depressed for a single character to be output.

In reference to eliminating or reducing force and repetition fatigue factors, three approaches taken in the prior art are illustrated in U.S. Pat. No. 4,332,493, issued to Einbinder, U.S. Pat. No. 4,849,732, issued to Dolenc, and U.S. Pat. No. 5,178,477, issued to Gambaro.

Einbinder discloses a typewriter keyboard in which the keys are arranged to conform to the "footprint" of the human hand. This layout of keys is designed with topographically height- and angle-differentiated actuation pads that attempt to minimize overall hand and finger motion. However, the Einbinder device stresses the importance of having "home positions" for the finger and thumb tips, from which position the fingers, and therefore the hands, must travel appreciably in order to perform typical typing operations. Thus, the Einbinder device eliminates only a portion of the problem in solving the motion difficulties encountered with conventional keyboards.

Similarly motivated by safety-related concerns, Dolenc teaches a one-hand key layout that includes a fanlike array of plural keys distributed in elongated rows and organized for specific actuation by the thumb and four fingers of the hand. Dolenc's device is concerned with minimizing hand motion, but not finger motion. In fact, Dolenc speaks in terms of organizing keys in arrays in such a fashion that they take into account the "motion and range of the respective fingers of the hand." Thus Dolenc clearly considers fingertip actuation of each key. While Doleric seriously addresses the issue of minimizing hand motion, his system does not appreciably contribute to minimizing finger motion, nor to related wrist motion. In addition, this device does not address the angular and topographical distinctions for individual keys, such as those described in the Einbinder patent. Dolenc also does not establish a "home position" for the tips of the fingers and thumb, as did Einbinder.

Gambaro discloses an ergonomically designed keyboard that is organized with an array of keys that are disposed generally "to complement the splayed underside architecture of the user's hand." A two-handed implementation is disclosed wherein each array includes, for each finger of the hand, a cluster of input keys that are placed in such a manner that they enable key actuation via only "slight, gestural, relatively closing motion of a portion of a confronting finger, and for the thumb in each hand." In addition, this design tries to overcome ergonomic problems with a set of keys disposed within two adjustable "hand-print"-shaped depressions. No appreciable movement of the fingers from the fingertip down to immediately below the first finger joint is required, each finger being capable of accessing four keys for the middle, ring, and little fingers, eight keys for the first finger, and a multitude of keys for the thumb. Again, even though drastically reduced, finger movement is still required, and all fingers are required for full key set actuation.

Other issued patents that address modified keyboard and character arrangements include U.S. Pat. No. 4,244,659, issued to Malt, U.S. Pat. No. 4,509,873, issued to Ryan, U.S. Pat. No. 4,579,470, issued to Casey, U.S. Pat. No. 4,597,681, issued to Hodges, U.S. Pat. No. 4,655,621, issued to Holden, U.S. Pat. No. 5,006,001, issued to Vulcano, U.S. Pat. No. 5,017,030, issued to Crews, U.S. Pat. No. 5,029,260, issued to Rollason, U.S. Pat. No. 5,067,834, issued to Szmanda U.S. Pat. No. 5,087,910, issued to Guyot-Sionnest, and U.S. Pat. No. 5,137,384, issued to Spencer. None of these addresses the issues of keyboard use and motion injuries.

Computing devices are regularly used for relatively long periods of time by people of all ages and abilities, it is becoming increasingly important that a device also accommodate the physically challenged. Prior art devices in general demand considerable manual and digital dexterity to operate, making them difficult for some portion of the population to utilize efficiently and effectively.

Two types of hand rests, both for partial and fall hand support, have been identified in the prior art. One kind acts as an actuator and is not intended to support a substantial part of the weight of the hand, but instead to impart some function. Another type of hand rest known in the art serves only to spare the fingers from the proximity-actuated keys, to avoid accidentally operating the keys.

Applicant has previously obtained U.S. Pat. Nos. 5,638,062 and 5,473,325 for ergonomically designed data input devices. Both of these patents disclose a hand or palm operated device which selects data input by sliding of a dome-shaped member towards different sectors of a circle. For typing purposes, two such members are used, one controlled by each hand, so that two signals can be generated and combined to produce as many keystroke entries as are generated by a conventional typewriter style keyboard. The present application is directed to improvements in the structure disclosed in applicant's prior patents.

SUMMARY OF THE INVENTION

Given the growing concern over keyboard-related finger and hand motion problems, it is an important aspect of the present invention to provide an ergonomic human-computer interface apparatus that obviates overuse injuries, with the primary focus on the entire aggregate of hand, wrist, and finger motions.

The apparatus in one embodiment comprises a pair of input devices, one for each hand. The device comprises a base and two palm-engaging supports in the shape of a dome that fits in close complementary relationship with the palmar architecture of the hand in a relaxed state. Thus the hands and wrists of the user can be maintained in their most relaxed position, with the domes tilted toward the user and away from the user's left-right midplane. The dome is coupled through movable means to the device base, which is in the shape of a shallow receptacle having a bottom. The receptacle is dimensioned so that the lower edge of the dome can be positioned above the lower edge of the base.

In one embodiment the dome is maintained in a substantially "home" or "centered" attitude when not under stress. When the dome is subjected to a sliding motion, a spring mechanism exerts a force on a sensor, and means are provided to sense the movement and location of the dome for a specified direction of moving from the "home" position. An eight-legged spring exerts tangential forces to the sensor that correlate one-to-one to the motions of each dome and flower pedal arrangement.

In the preferred embodiment, a ergonomic handpiece, or dome, is attached to a kinematic map plate that is positioned above and affixed to the armature, the plate having a variable depth depression in the shape of a flower, the flower-shaped depression having a number of pedals. The plate passes through a upper director plate and mates to a four post statically located member (spider) that actuates vertically along two posts on the upper director plate and, the spider posts mate to the center of the kinematic map plate flower pedals to provide the means of guidance into one of the domes eight cardinal movement zones. When the dome is moved sufficiently linearly far, it is moved into one of the flower points. Means for registering dome displacement are provided via the mating of the flower pedal shape and the spider member, which in turn generate a location signal.

When a location signal is generated by each input device sequentially or simultaneously, the pair of location signals is translated into a unique "keystroke" signal. It can be seen that the possible number of unique keystroke signals available is related to the number of flower pattern pedals in each input device; namely, it is equal to the number of flower pattern pedals in the right-hand input device times that in the left-hand input device. This combination of signals to generate a unique keystroke is called chording. The system of chording described here can be used to access a set of user-definable characters, which can then be manipulated into a form suitable for transmission to a computer or like electronic device. Although chording has been used in some prior art keyboards, the particular scheme of chording used in the present invention is unique.

An additional set of keystrokes is accessible by generating location signals from each input device used alone. The number of possible unique keystroke signals available in this way equals the number of flower pedal points in the right-hand device plus the number of star points in the left-hand device.

A conventional keyboard typically contains individual keys, each having the keystroke it represents imprinted thereon. An equivalent feature is disclosed here to assist the user in locating the sectors into which the domes must be linearly moved to produce a given keystroke. This comprises a color-coded annulus, one associated with each dome, which contains indicia that provide a correspondence between dome attitude and keystroke. The user affixes this annulus to the top edge of the device base wall, where it is visible.

The invention described herein requires no appreciable hand or wrist motion and no finger motion, and since the movement required is relatively small, only a slight motion of a user's arms is required to output a desired keystroke. More specifically, use of the proposed device requires little shifting of the hand from a rest position, and does not require wrist rotation for maneuvers that are performed on conventional keyboards by the four fingers and the thumb. Since the fingers are not required to perform any maneuvering for typing, instead of focusing on finger-tip activation, the present device is designed to call for only slight motion of a person's arm and/or hand for actuation of keystrokes.

The left hand and right hand domes have different switches to enact various keyboard functioning. In the left hand dome, a switch is provided at the location of the top surface of the upper director plate. Applying vertical pressure to the dome activates this switch. When the switch has not been depressed, a first set of unique keystroke signals is available, as described above. A single depression and release of the dome permits access to a second set of keystroke signals equal in number to the first set. For instance, depressing and holding of the left dome may access the "shift" function. Depressing and releasing the left dome can activate the "shift-lock" function.

In another aspect of the present invention, special switching means is provided for selectively altering the location of a cursor by placing one dome into a "mouse" mode. A single sequential depression and release of the right hand dome allows that dome to act as a positioning cursor or "mouse". It is this vertical actuation that rotates the ramps via little triangles in the spider. The spider moves vertically to one of two positions on vertical actuation of the right hand dome. One position allows the spider to seat firmly in the flower pedal shape to aid in dome guidance and the other position is at a level where the spider is not seated in the flower pedals giving the kinematic plate the freedom to move about in 360 degrees. To effect this capability an opposing ramp geometry mechanism rotates the ramps 45 degrees to actuate a switch that enables the mouse mode and lowers the spider to the "free form" position. When the ramp is rotated and the mouse switch is activated (when the needle switch is bent) the mouse mode is initiated. Once initiated, the electronic logic senses the mode and allows for mouse cursor movement using the right hand dome and the left hand dome is then used for the mouse left, right, and middle clicks (up to sixteen different clicks can be programmed in the device). No comparable cursor control system is known in the art. This type of built-in cursor, or "mouse," activation and control allows for total hand on-board typing and cursor control. The right switch is mounted on the top surface of the upper director plate on the right hand dome assembly. Applying vertical pressure to the dome activates this switch. When the switch has not been depressed, a first set of unique keystroke signals is available, as described above. A single depression and release of the dome permits access to a mouse navigation signal.

In another embodiment of the disclosed invention, palm and finger pads are provided on the dome to engage and support the hand. None of the prior art hand rests purports to support the hand while in motion, all having been specifically contoured to fit the shape of a static hand.

The present invention permits maximum flexibility in defining character location, activation force, activation displacement, and physical orientation of the keyboard; it can be used by a physically challenged individual because it will permit adaptation to his or her unique physical requirements. In addition, because finger movement has been totally eliminated, individuals with partial hand or finger paralysis or absence can still manipulate the device. The flexibility inherent in the positioning of the hands and arms will thus provide significantly improved ergonomic character.

Additional flexibility is provided in that variable dome sizes can be made to accommodate any user. In recognition that a "one-size-fits-all" approach may not be entirely appropriate to deal with users' hands that are significantly larger or smaller than a "median" hand size, the structure of the invention proposed herein permits different dome sizes to accommodate a range of hand sizes and finger spans. In addition, it can be appreciated by one skilled in the art that other ergonomically satisfactory shapes besides domes may be utilized, such as balls or flat boards.

The symmetry and function of the design allows for another reduction in the size of the handpiece dome and other components, thereby making it an ideal candidate for miniaturization. Miniaturization of the keyboard has been up to this a difficult task because of the need to accommodate human fingers. The invention described herein allows for easy miniaturization because the finger metrics are not considered as part of the design. In fact, one embodiment requires the use of only one finger, preferably the thumb, of each hand, to operate the apparatus. For example, the control mechanism disclosed can be implemented as a pair of thumb-operated elements on the face of devices such as a Palm Pilot® or Game Boy® hand-held units.

Since the design contains no unitary "keys" requiring independent movement, it is possible to make the devices completely sealed to be weatherproof so that they are hostile-environment ready. Their design allows for total enclosure, and therefore protection, from water, dirt, dust, etc. No comparable air-tight system is known in the art.

Designing the device entailed an analysis of the functional capabilities of the hand and in particular how to eliminate finger movement. The capabilities were based on physical as well as physiological components of the musculature and dimensions of the hand. Using this information, a key and control layout was created around these capabilities, taking into account the hand's form and function, capitalizing on strengths and designing out weaknesses, especially in the fingers. The resulting design is uniquely natural and efficient, and is easy to learn and use.

It can be appreciated that another possible embodiment of the present invention comprises a unitary input apparatus as already described for one-handed operation. A certain set of keystrokes is accessible by rocking the dome into the available signal-generating sectors, the number of keystrokes available being equal to the number of sectors. In addition, chording is possible with the use of the switching means described above. In this embodiment, the user rocks the dome into one sector, simultaneously depressing the dome sufficiently to activate the switching means. While maintaining vertical pressure on the dome, the dome is returned to the "home" position, and then moved into a second sector. The signals generated by the motion of the dome are then "chorded" in a similar fashion to that utilized in the dual input device embodiment.

BRIEF DESCRIPTION OF THE DRAWINGS

FIGS. 5 and 5A illustrate details of the assembly to the dome apparatus in two respective positions;

DETAILED DESCRIPTION OF THE PREFERRED EMBODIMENT

Figure 1:
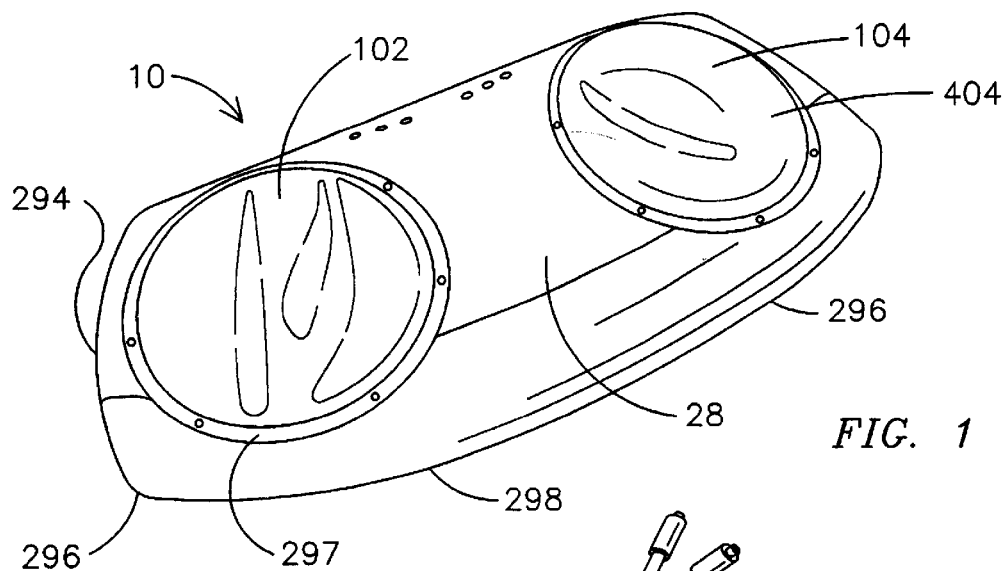
FIG. 1 is a perspective view of a keyboard illustrating one embodiment of the invention, using two domes shaped to fit the natural shape of the hands at rest.
Figure 2:
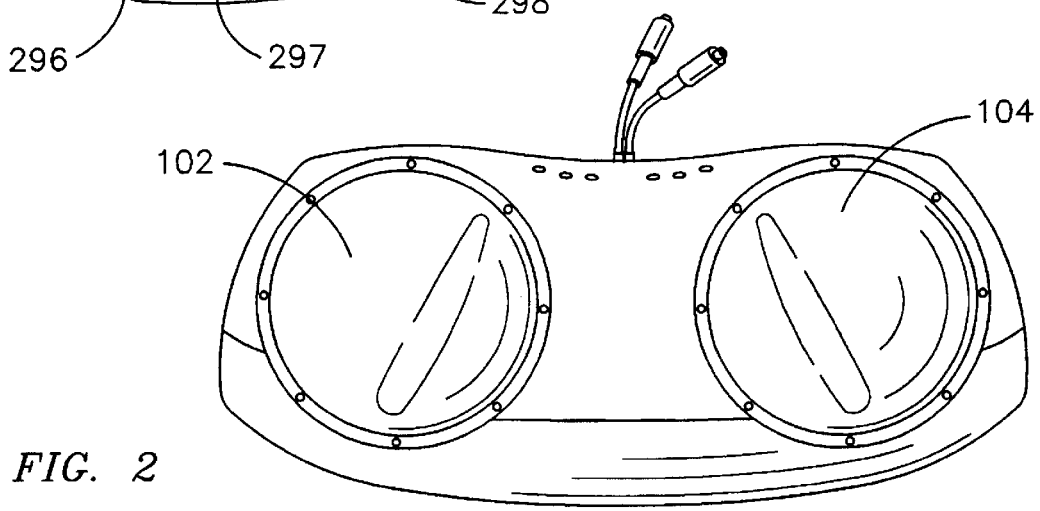
FIG. 2 is a top view of the keyboard of FIG. 1, illustrating the general shape of the keyboard.

Referring to FIGS. 1 and 2, there is indicated generally by the numeral 10 an ergonomically designed interface apparatus for entering information by a human operator to a suitable electronic system (not shown) such as a computer. The coupling arrangement between apparatus 10 and the computer, which entails an electronic device coupled with an electronic alphanumeric device, is well known to those skilled in the art. As it forms no part of the present invention, this coupling is omitted from the present discussion but will be recognized as comprising a communication link using a cable, infrared transmitter/receiver or other suitable means.

In accordance with the underlying objects to which the present invention is directed, device 10 takes on a sculpted form that is intended to complement closely the typical palmar architecture of the human hand at rest. Accordingly, apparatus 10 has bilateral symmetry, which can be seen in FIG. 2, with a left-hand device 102, which conforms to a user's left hand, and a right-hand device 104, which conforms to the user's right hand. In one embodiment, various hand-shaped domes is formed in each device to aid in positioning and improving comfort. Devices 102 and 104 are secured to a base 28, respectively. These structures in the preferred embodiment are formed of molded plastic.

For simplification, the structure and operation of the interface device 10 is described hereinafter with reference to right-hand input device 104, it being understood that device 102 is structurally identical. Base 28 in the preferred embodiment comprises a shallow truncated receptacle with a bottom 298 and curved side wall 296 to create an interior space dimensioned to permit dome 104 to fit within the space. In an embodiment suitable for hostile environments, input device 104 can be completely sealed and airtight. This is accomplished by attaching one edge of a rubberized expandable gasket (not shown) around the lower edge of the dome and the other edge of the gasket to the top surface of base 28. Gasket is sufficiently flexible to enable the working of dome 104 and may be accomplished by using an accordion pleated gasket.

Dome 104 is coupled (see FIG. 5) to base 28 via a ridged annulus 106 that is attached at its raised upper end 108. Annulus 106 has a corresponding spring loaded connection to an armature 110. Annulus 106 fits inside inverse receptacle pattern 230 (see FIG. 6) on the underside 231 of dome 104.

The tension parameter associated with a sliding motion can be modified in the armature 110 with the use of a spring 116. Spring 116 is snapped into armature hole 118. It can be seen that the installation of a heavier spring (force) will increase the tension associated with moving armature 110, and, hence, with sliding dome 104. Increasing the tension will not lead to an increase in force required to activate switch 120, the operation of which will be described later.

When an operator's hand is positioned atop dome 104, linear movement of kinematic plate or annulus 106 can be seen to cause a motion in armature, which is mounted on sensing unit 122 below upper director plate 124. Armature 110 forms part of transducer structure, which is coupled to the position sensing device 122 which in turn is affixed to base bottom 298.

Kinematic plate 126, containing flower pedal-shaped impression 128, which has eight pedal arranged grooves in the most preferred embodiment, is constructed and positioned as follows. Kinematic plate 126 having four flower pedal-shaped impressions 128, is placed over four posts of spider mechanism 130 mating to the center of each flower pedal impression on kinematic plate.

Flower pedal-shaped impressions 128 define the possible movement of the dome 104 in the following manner. As dome 104 is moved linearly from a center resting location, a linear displacement is induced on the kinematic plate 126. Because the flower pedal shapes are providing the only source of guidance when mated with the spider, the motions of the dome are therefore restricted to the motions of the flower pedal. The flower pedal moves along the statically located spider tips to provide positive guidance of the domes into one of their eight respective positions.

Linear displacement of kinematic plate can be induced only to the extent of the spider posts reaching one of the eight flower pedal points 132. Thus each of the flower pedal points 132 creates a "stop" to kinematic plate movement. The extent of kinematic plate displacement needed to reach one of these "stops" defines the point at which the sensing unit 134 outputs a location signal.

The eight-position flower pedal geometry can be easily replaced with any aperture having from one to twelve points, and, in addition, the size of the flower can be varied. Since the transduction of lineary displacement into a location signal is software controlled, there is virtually unlimited flexibility inherent in this system.

Kinematic plate 126 travels freely through upper director plate 124 in both the vertical direction to allow activation of switch button 120, which is used to enable cursor control (a "mouse") and to signal an operation and the horizontal position to allow horizontal movement of the dome to allow for typing alphanumeric characters. Switch button 120 is affixed atop the director plate 124 of the structure and immediately beneath the spider 130 but not in contact with the spider bottom. When kinematic plate 126 is depressed via dome 104 being pushed downward and then released, spider mechanism 130 moves along the two spring loaded posts on the upper director plate, which in turn depresses button 120 mounted on top of upper director plate. Button 128 in turn registers activation via lead 136. In this embodiment, a single depression of switch button 120 outputs a "shift" signal; a single click activation enables access of the "shift lock" function, double click initiates "num lock". When the single input device embodiment is desired, the switching means further permits the user to "chord" two location signals from one input device to create a keystroke, as will be discussed in the method section.

Figure 3A:
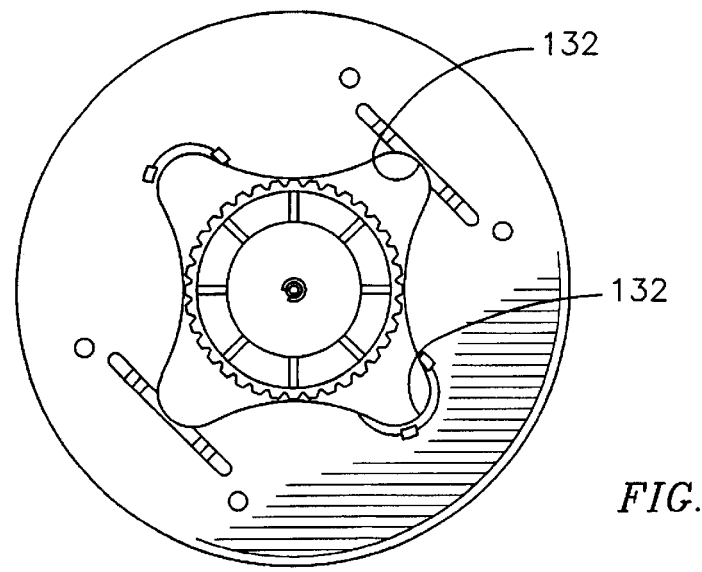
FIG. 3 is an exploded view of the keyboard of FIG. 1 illustrating generally the components forming the underlying structure.
Figure 3:
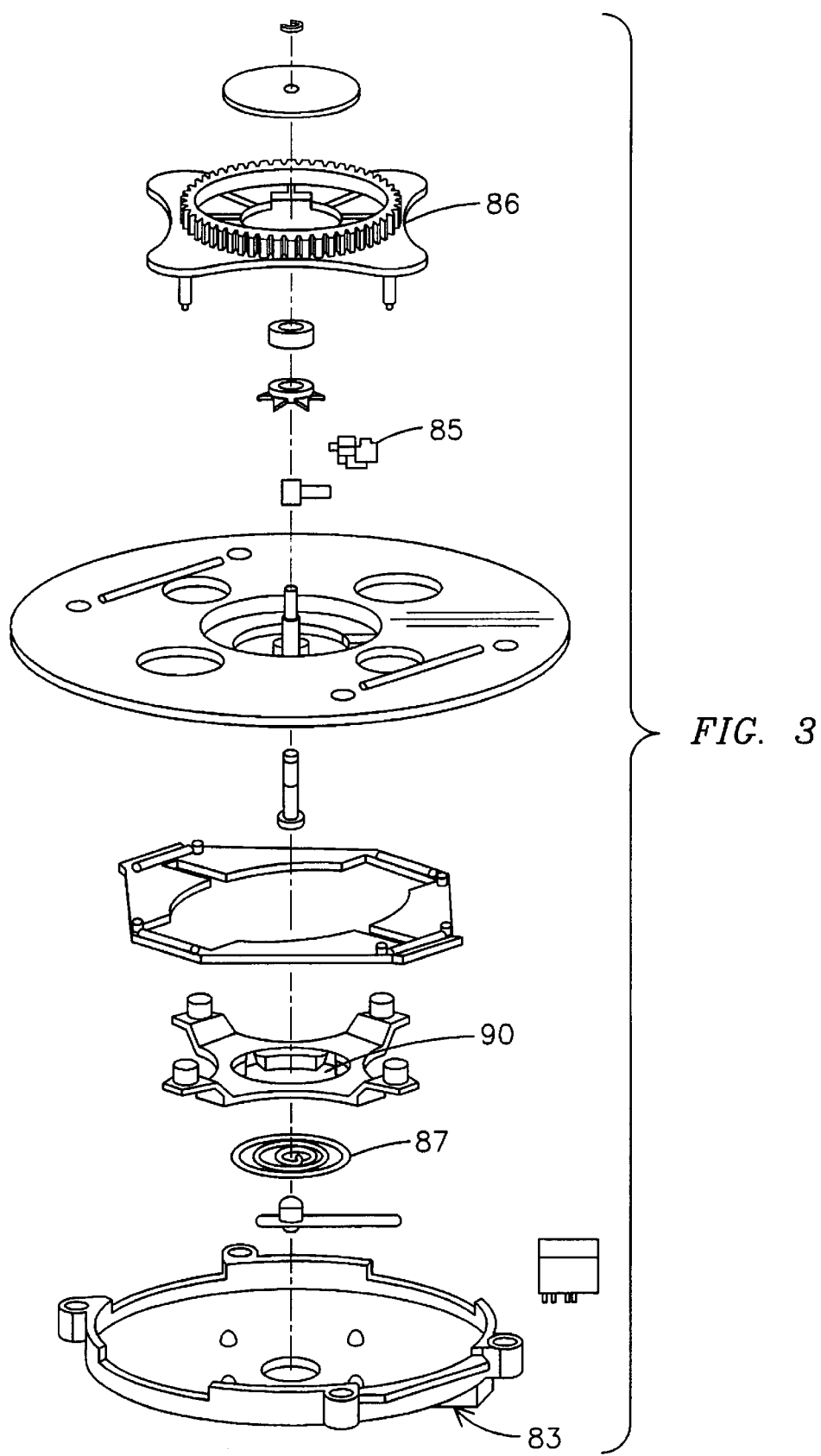

Considering FIGS. 3 and 5, kinematic plate 126 passes through the center of upper director plate 106. The previously described linear motion of dome 104 induces a movement of kinematic plate 106 into one of the flower pedal points 132. Character definition ring 138 p (See FIG. 6) provides indicia that, when used either alone or in concert with character definition ring 140 on the left-hand input device 102, provide a correspondence between dome-attitude and the keystroke generated. (See section on method of use.) In this embodiment, eight radially disposed sectors 47, 48, 49, 50, 51, 52, 53, and 54 on character definition ring 224 correspond to the eight star points 142. Intersecting radial sectors 47–54 are five concentric rings 144, 146, 148, 150, and 152 on character definition ring 138, forming a grid that defines the keystroke characters. In the preferred embodiment the rings are color coded to aid the user in keystroke production. For the selector and keystroke ring combination described here and shown in FIGS. 2a and 2b, eight distinct colors would be needed, with colors appearing on the eight radial sectors of left-hand selector ring 140. The eight radial colors are associated to eight colored concentric rings on the right hand dome.

The dome 102 provided for the user's left hand in device 10, appearing on the left-hand side of FIG. 1, is, generally speaking, a mirror image of what has just been described for the right-hand side of FIG. 1.

Two motions are then required to access a single keystroke appearing on rings as will be described in the method section. This is in contrast to the conventional keyboard, which requires the hands to be in an offset relationship with respect to the arm in the normal operation of the keyboard. As a result of this design, it is possible to minimize, if not completely eliminate, the strain and stress on the wrist and interconnecting musculoskeletal portions of the wrist, arm, and hands. Additionally, one can anticipate that learning the circular key layout, as well as the dome manipulation technique, will be easier and that accuracy will increase over totime.

When the dual input device embodiment is utilized, which is considered the preferred embodiment, keystroke signals are generated in one of two ways: using a single dome to access one of eight keystrokes available from each device, or using a chordal motion. In "chording" a combination of two signals, one from each device 102 and 104 in the apparatus, is translated into a single signal having a unique correspondence with one of a set of keystroke signals.

Software means, which are not a part of this invention, are used to effect this translation. Indeed, as this part of the process is software controlled, it can be seen by one skilled in the art that virtually unlimited flexibility is possible in character location and definition, thus enabling the user to create special sets of characters or direct digital control signals as needed.

Figure 4:
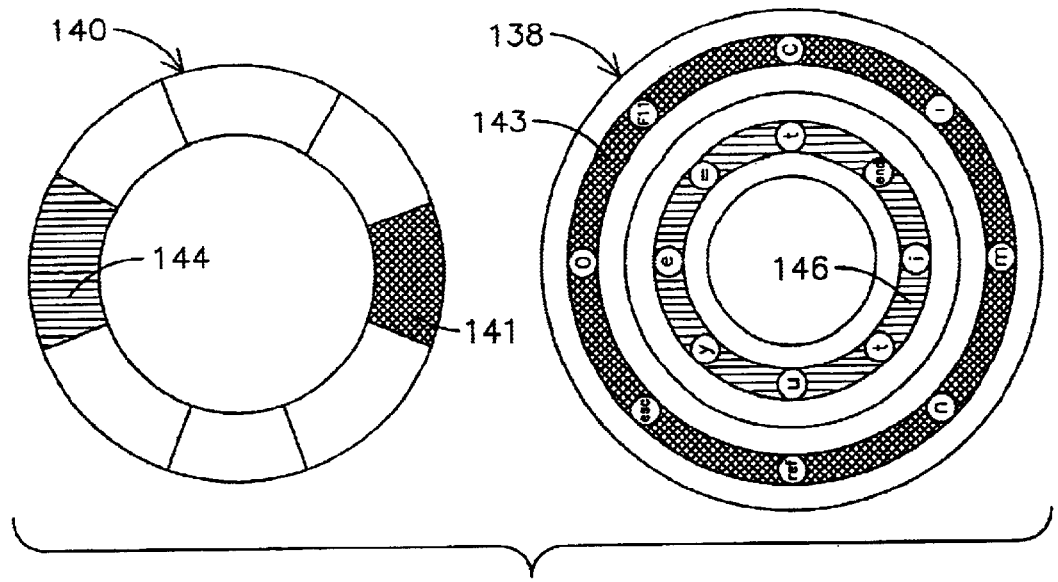
FIG. 4 illustrates a pair of character definition rings for the keyboard.

The generation of keystroke signals will be described with reference to FIGS. 1 and 4, which depict character definition rings 138 and 140 and their respective sets of available characters.

The method of generating keystroke signals using devices 102 and 104 simultaneously, that is, by "chording," will first be described. Each of these character selector rings 138 and 140 comprises eight concentric rings: eight color-coded rings radially divided into eight sectors, as described in the apparatus section. Sliding one dome into one of the eight colored sectors of its selector ring provides half of the "chord" needed to output a keystroke signal, and indicates to the user in a color-coded fashion which set of characters of the correspondingly colored band on the opposite ring will be accessible.

Figure 6:
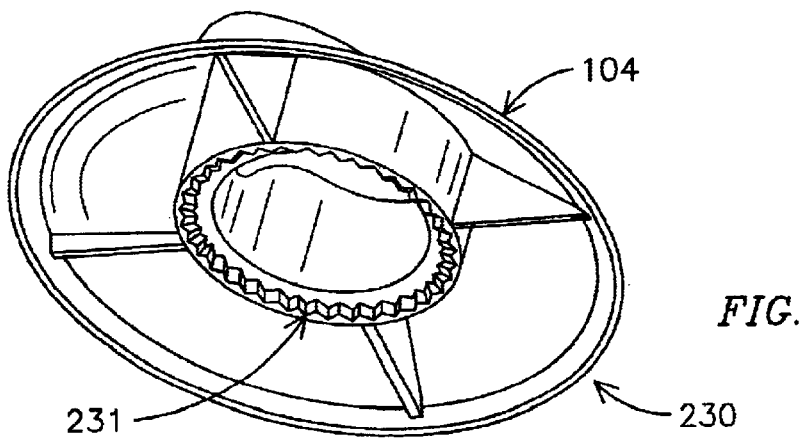
FIG. 6 illustrates the underside of one dome.

As an example, if the color red indicated by the red sector (cross-hatched) 141 of ring 140 in FIG. 6, is chosen with the left-hand dome, the set of characters shown in red ring (cross-hatched) 143 on the right hand dome is enabled. The reverse process also holds. This design has been implemented to enable to user to utilize is less precision with one hand than the other and allow for either sequential or simultaneous movements. It can further be seen that character definition (which is software controlled) could take into account the user's handedness by placing those characters that are most often used in positions requiring, for instance, less precision with the left hand than the right.

Keystrokes may also be generated by a single device 102 or 104 simply by sliding only one dome 102 or 104 into a flower pedal point, leaving the other dome in its "home" position.

It can be seen that in this embodiment there are 64 unique keystrokes available. Activating the switch 120 doubles this number, and, in the most preferred embodiment, the indicia present on character definition rings 138 and 140 would also comprise a second symbol set indicative of the keystrokes that would be generated with the device placed in the "shift" mode. For simplicity this second set of keystroke symbols has been omitted from FIG. 4.

A single input device to output a set of keystrokes can also be used. Again, keystrokes may be generated either by sequential or simutaneous chording or by a single motion.

Chording is accomplished by two successive linear motions of the dome and also involves the switching apparatus located at the base of shaft 142. Specifically, to output the letter "e," for instance, the dome is linearly moved into the hatched sector 144 located on the selector ring 140 while depressing the dome to activate the switch. With or without releasing the vertical pressure on the switch, the dome is returned to the "home' position and then rocked into sector 146. Hatched ring sector 146 is seen to correspond to the letter "r."

It can be seen that in this embodiment there are 64 unique keystrokes available. Activating the left dome switch 120 doubles this number to 128, and, in the most preferred embodiment, the indicia present on character definition ring 140 would also comprise a second symbol set indicative of the key strokes that would be generated with the device placed in the "shift" mode. For simplicity this second set of keystroke symbols has been omitted from FIG. 4.

Figure 7:
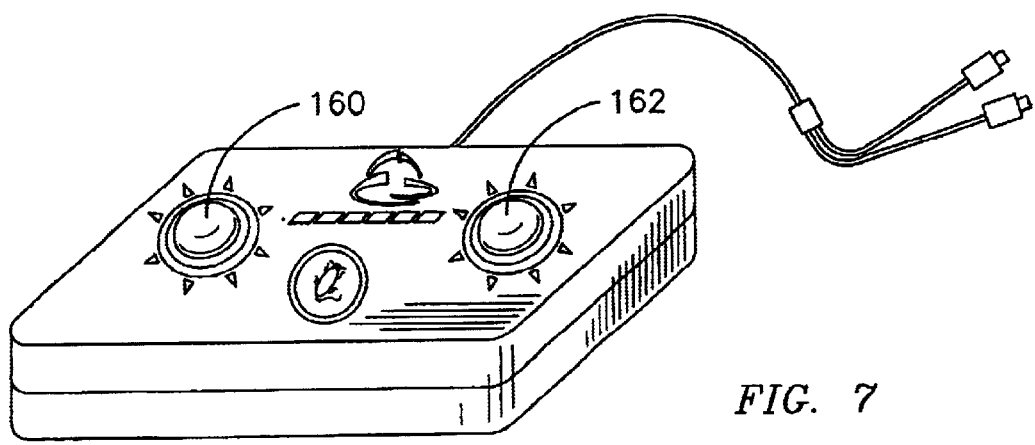
FIG. 7 illustrates a hand-held, thumb operated apparatus.

Turning now to FIG. 7, there is shown a perspective view of the application of the present invention to a hand-held device in which the palm controls 102 and 104 are implemented in the form of thumb controllers 160, 162. This type of device would typically be used with a Palm Pilot® or Game Boy® to allow the user device to hold the device in two hands and use a thumb of each hand to control the respective thumb controllers. The structure underlying the thumb controllers can be a miniaturized version of the structure described above with regard to FIGS. 3 and 5.

Figure 8:
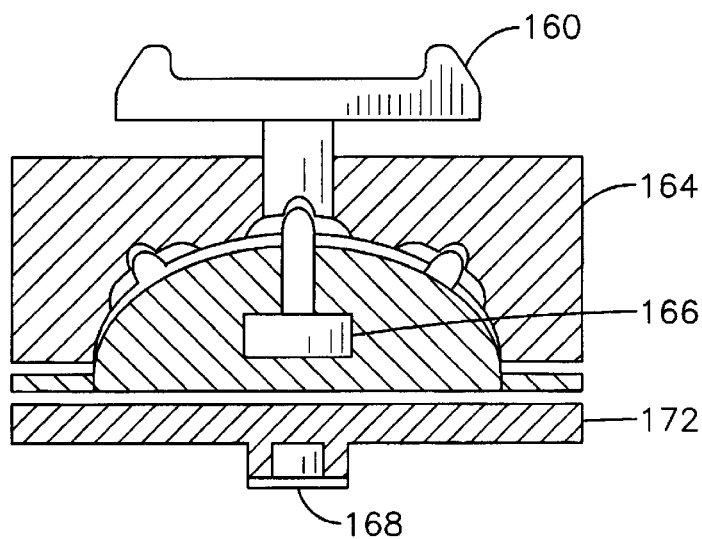
FIGS. 8 and 9 illustrate cross-section and exploded views, respectively, of the apparatus of FIG. 7.
Figure 9:
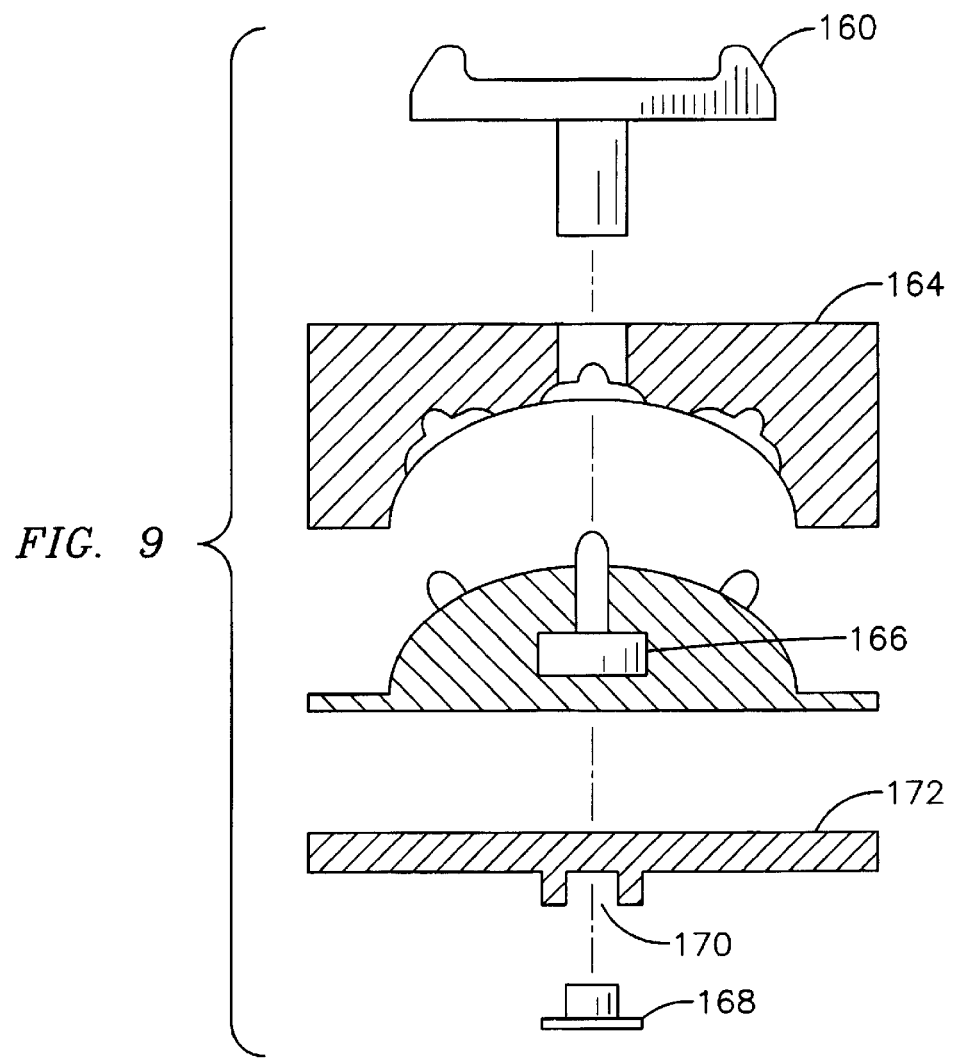

FIG. 8 is a cross-sectional view and FIG. 9 is an exploded view of one implementation of the thumb control used in the embodiment of FIG. 7. In FIG. 9, it can be seen that the exposed thumb control 160 extends through a top housing section 164 and connects to a switch device 166. The switch device 166 may have actuation switches attached to allow sensing of depressing of the switch in the same manner as was implemented with regard to switch 120 in FIG. 5. A strain gauge pressure switch 168 fits within a recess 170 in a lower flexible plate 172. The plate 172 fits against a bottom portion of the switch 166 and senses lateral movement of the switch. The strain gauge may be of the type used in some laptop computers.

When the flexible plate rocks, the sensor registers and sends electric signals to a logic board which detects the direction in which the plate is being moved. The previously described flower pedal pattern can be impressed into the upper housing 164 to provide a guiding mechanism for the thumb controller 162. This would enable the thumb controller to be guided into precise locations for implementing a typing sequence of the kind described with regards to the device of FIG. 1.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

Having now described the invention, the construction, the operation and use of preferred embodiment thereof, and the advantageous new and useful results obtained thereby, the new and useful constructions, and reasonable mechanical equivalents thereof obvious to those skilled in the art, are set forth in the appended claims.

What is claimed is:

1. An input apparatus comprising:

a housing;

a controller moveably coupled with the housing;

a kinematic map plate moveably coupled with the controller such that the kinematic map plate moves in response to movement of the controller;

at least one impression formed in the kinematic map plate defining a plurality of keystroke-defining locations and a home location;

a spider mechanism that cooperatively engages the at least one impression to guide the controller for movement among the plurality of keystroke-defining locations and the home location;

an upper director plate for guiding the controller in at least one direction;

an actuator armature moveable in response to movement of the controller;

means for sensing a position of the controller operatively coupled with the actuator armature and the controller, the means for sensing a position of the controller configured to sense a movement of the controller from the home location to a first keystroke-defining location and generate a first location signal indicative of the keystroke-defining location;

means for biasing the controller so that it may be depressed and released and for biasing the spider mechanism against the kinematic map plate; and a processing means configured to receive the first location signal and translate the first location signal into a keystroke signal having a unique correspondence with the first location signal.

2. The input apparatus of claim 1 further comprising:

a second controller moveably coupled with the housing;

a second kinematic map plate moveably coupled with the second controller such that the second kinematic map plate moves in response to movement of the second controller;

at least one impression formed in the second kinematic map plate defining a second plurality of keystroke-defining locations and a home location;

a second spider mechanism that cooperatively engages the at least one impression of the second kinematic map plate to guide the second controller for movement among the second plurality of keystroke-defining locations and the home location;

means for engaging and disengaging the second spider mechanism with the at least one impression of the second kinematic map plate;

a second upper director plate for guiding the second controller in at least one direction;

a second actuator armature moveable in response to movement of the second controller;

means for sensing a position of the second controller operatively coupled with the second actuator armature and the second controller, the means for sensing a position of the second controller configured to sense a movement of the second controller from the home location to a second keystroke-defining location and generate a second location signal indicative of the second keystroke-defining location;

second means for biasing the second controller so that it may be depressed and released and for biasing the second spider mechanism against the second kinematic map plate;

means for switching the apparatus between a mouse mode and a keyboard mode, the switching means activatable by depressing and releasing the second controller; and wherein the processing means is further configured to receive the first and second location signals and translate the first and second location signals into a keystroke signal having a unique correspondence with the first and second location signals.

3. The input apparatus of claim 2 wherein the controller and the second controller are each formed having a contoured upper surface that substantially conforms to the palmer architecture of a human hand and wherein the controller and the second controller are positioned within the housing to have a bilateral symmetry.

4. The input apparatus of claim 2, wherein the respective at least one impression formed in the kinematic map plate and the second kinematic map plate form eight respective keystroke-defining locations into which respective ones of the controller and the second controller may be moved.

5. The input apparatus of claim 2 further comprising:

means for switching the apparatus among a num lock mode, a shift mode and a caps lock mode, the switching means activatable by depressing and releasing the controller and wherein the processing means is configured to generate a keystroke signal indicative of an alphanumeric character in response to receipt of the first and second location signals.

6. The input apparatus of claim 2, means for engaging and disengaging the second spider mechanism with the at least one impression of the second kinematic map plate comprising a camming mechanism positioned within a center aperture of the second spider mechanism, the camming mechanism configured with an opposing ramp geometry to cause the second spider mechanism to rotate approximately 45 degrees when the second controller is depressed and engage the second kinematic map plate when the second controller is released so that the second spider mechanism and the second kinematic map plate are not cooperatively engaged thereby allowing the second controller to be moved about within 360 degrees to control movement of a cursor and wherein rotation of the second spider mechanism activates a switch initiating a mouse mode and wherein the processing means is further configured to allow the second controller to control movement of the cursor.

7. The input apparatus of claim 1, the means for sensing a position controller comprising:

a strain gauge affixed to a base portion of the housing; and a biasing means operatively coupling the actuator armature to the strain gauge such that the biasing means exerts tangential forces on the strain gauge in response to movement of the controller.

8. The apparatus of claim 7, the biasing means operatively coupling the actuator armature to the means for sensing a position of the controller comprising a coil spring.

9. The apparatus of claim 1, the means for biasing the controller so that it may be depressed and released comprising a spring coupled with the spider mechanism and positioned on an upper surface of the upper director plate.

10. The input apparatus of claim 1, the at least one impression comprising a centrally located indentation have a first depth and a plurality of grooves radially extending there from each having a second depth wherein the first depth is greater than the second depth.

* * * * *